2,938,899
// Patented May 31, 1960

2,938,899
DESCARBAMYLNOVOBIOCINS

Frank J. Wolf, Westfield, N.J., assignor to Merck & Co., Inc., Rahway, N.J., a corporation of New Jersey No Drawing. Filed Sept. 17, 1956, Ser. No. 610,388

3 Claims. (Cl. 260—210)

This invention relates to new chemical compounds related to novobiocin and dihydronovobiocin, methods of preparing the same, and methods for converting these compounds to valuable antibiotics. More particularly, it is concerned with 7-[tetrahydro-3,4-dihydroxy-5-methoxy - 6,6 - dimethyl - pyran - 2 - yloxy] - 4 - hydroxy-3 - [4 - hydroxy - 3 - (3 - methyl - 2 - butenyl - benzamido]-8-methylcoumarin, and the corresponding dihydro derivative in which the 3-methyl-2-butenyl substituent has been replaced with 3-methylbutyl.

Novobiocin, 7 - [4 - (carbamoyloxy) - tetrahydro-3 - hydroxy - 5 - methoxy - 6,6 - dimethyl - pyran - 2-yloxy] - 4 - hydroxy - 3[4 - hydroxy - (3 - methyl - 2-butenyl)-benzamido]-8-methyl-coumarin, which can be represented structurally as follows

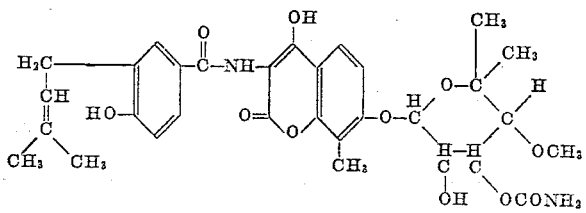

and dihydronovobiocin, which is similar in structure to novobiocin but has a 3-methylbutyl group in place of the 3-methyl-2-butenyl group in novobiocin, are valuable new antibiotics which are active in inhibiting growth of gram-positive microorganisms primarily, although they also exhibit some activity against gram-negative microorganisms.

The new compounds of this invention, 7-[tetrahydro-3,4 - dihydroxy - 5 - methoxy - 6,6 - dimethylpyran -2-yloxy] - 4 - hydroxy - 3 - [4 - hydroxy - 3 - (3 - methyl-2-butenyl)-benzamido]-8-methylcoumarin and the corresponding dihydro derivative in which the 3-methyl-2-butenyl substituent is replaced with 3-methylbutyl, differ from novobiocin and dihydronovobiocin respectively by the absence of a carbamyl group. In view of this close relationship, these new compounds are hereinafter referred to as descarbamylnovobiocin and descarbamyldihydronovobiocin respectively.

It has now been found that descarbamylnovobiocin occurs in certain preparations of novobiocin. The presence of this compound in novobiocin preparations was discovered when these preparations were subjected to paper chromatographic analysis. Subsequently, it was found that descarbamylnovobiocin was formed in alkaline solutions of novobiocin, and, can be conveniently prepared from novobiocin by careful treatment with dilute alkali. Thus, when a solution of novobiocin in 1/10 normal sodium hydroxide is allowed to stand at room temperature for about 4 days, most of the novobiocin is converted to descarbamylnovobiocin.

Similarly, descarbamyldihydronovobiocin is found to be contained in preparations of dihydronovobiocin and can be observed in paper chromatographic analysis of dihydronovobiocin. Descarbamyldihydronovobiocin can be similarly prepared by subjecting dihydronovobiocin to the action of dilute alkali.

In accordance with another embodiment of the present invention, it is now found that descarbamylnovobiocin and descarbamyldihydronovobiocin can be converted to the active antibiotics novobiocin and dihydronovobiocin by reaction with suitable carbamylating agents. Thus, when descarbamylnovobiocin or descarbamyldihydronovobiocin is intimately contacted with carbamylchloride in the presence of a suitable organic base, novobiocin or dihydronovobiocin respectively is produced and can be readily isolated and recovered in pure form.

The following examples are presented as illustrative embodiments of specific methods of preparing descarbamylnovobiocin and descarbamyldihydronovobiocin and of converting these substances to novobiocin and dihydronovobiocin respectively.

Example 1

Novobiocin (100 g.) obtained as described below, was dissolved in 300 ml. of a mixture of benzene and methanol (1:2), and the pH of the resulting solution adjusted to about 7.4 with a 10% solution of sodium methoxide in methanol. The resulting solution was then diluted with about 700 ml. of benzene. Upon standing, the sodium salt of novobiocin crystallized from the resulting solution and was recovered by filtration. The resulting filtrate was extracted twice with about 1/10 volume of water and the aqueous extracts were concentrated under reduced pressure to one half the original volume. To the concentrate was added about 15 g. of diatomaceous filter aid and sufficient dilute hydrochloric acid to adjust the pH of the solution to about 3. The resulting precipitated product together with the filter aid was recovered by filtration and dried. The product so obtained contained about 25% by weight of descarbamylnovobiocin. It was dissolved in 100 ml. of anhydrous acetone and filtered to remove the filter aid. The resulting solution containing the crude material which consists of about 50% descarbamylnovobiocin was chromatographed over 450 g. of activated alumina in a column 2 inches in diameter. The column was then developed with anhydrous acetone and 8 fractions of 300 ml. each were collected and analyzed by paper chromatography. Purified descarbamylnovobiocin was obtained by concentrating the first 4 cuts to dryness. The product so obtained weighed about 6.3 grams and contained about 80% descarbamylnovobiocin. This product melted at 135–145° C.

The novobiocin employed in the above process was obtained as follows:

Fermentation broth containing novobiocin was heated to 60° C. for 20 minutes at pH 7.5–8.0, and after cooling was filtered. The filtered broth was adjusted to about pH 6.5 and extracted with 1/5 volume of amylacetate in a two stage counter current extraction apparatus. The amylacetate extractions were extracted with about 1/3 volume of water containing sufficient ammonia so that the final pH of the aqueous extract was 9.7–10.5 using a two stage counter current extraction apparatus. The same process of extraction into amylacetate and ammonia water was repeated and the final aqueous solution diluted with methanol to a solvent ratio of 35% methanol-65% water and the mixture acidified. Upon standing novobiocin crystallized from the resulting solution.

Example 2

Novobiocin was dissolved in 0.1 N sodium hydroxide to make a 2% solution. The solution was allowed to stand at room temperature for 96 hours at which time paper chromatographic analysis indicated that more than 75% of the novobiocin had been converted to descarbamylnovobiocin. The solution was acidified to pH 3 with stirring. The flocculent precipitate of crude descarbamylnovobiocin was filtered and dried. Purification was effected by dissolving the crude product in acetone to make a solution of 30% solids, filtering from any novobiocic acid which crystallizes, and precipitating the descarbamylnovobiocin by the addition of petroleum ether. The recovered product melted at 130–140° C. The product has absorption maxima at 3125 A. when dissolved in aqueous 0.1 N NaOH ($E_{1cm}^{1\%}$ about 600)

and 3250 A. when dissolved in aqueous 0.1 N HCl in methanol ($E_{1cm}^{1\%}$ about 440)

The product is optically active, $\alpha_D^{24}$ −17.7 in methanol.

*Example 3*

When the process of Example 2 was repeated using dihydronovobiocin as the starting material, descarbamyldihydronovobiocin having a melting point of 142–143° was obtained.

*Example 4*

About 500 mg. of descarbamylnovobiocin was dissolved in 5 ml. of dioxane and ½ ml. of a 20% solution of carbamylchloride in dioxane was added. The mixture was allowed to stand at room temperature about 2 hours. The resulting novobiocin was precipitated by diluting the dioxane solution with 10 volumes of water. The novobiocin so obtained can be further purified by recrystallization in accordance with methods known in the art to obtain the product in pure form.

*Example 5*

When the process of Example 4 is repeated using descarbamyldihydronovobiocin as the starting material, dihydronovobiocin is obtained.

In the foregoing described examples, the descarbamylnovobiocin and the descarbamyldihydronovobiocin can be readily distinguished from novobiocin and dihydronovobiocin respectively by paper chromatographic analysis. This analysis can be carried out as follows:

Filter paper (Whatman No. 1) is impregnated with capryl alcohol by dipping into a mixture of methanol-capryl alcohol and the excess solvent removed by blotting. A solution containing about 40–200 micrograms of the material under investigation is applied to the paper and buffer (pH 8.3, 0.1 N phosphate) is allowed to flow down the sheet. Novobiocin and descarbamylnovobiocin may be readily visualized by means of ultra violet light absorbence and the novobiocin is readily detected by bioautographic methods. With this system novobiocin has a RF of 0.25 and descarbamylnovobiocin has a mobility of about 1.1 times that of novobiocin and dihydronovobiocin has a mobility of about 0.6 that of novobiocin. In practice, it is found convenient to develop the chromatogram until novobiocin has traveled about 0.8 of the length of the paper strip. The relative amounts of descarbamylnovobiocin and novobiocin or descarbamyldihydronovobiocin and dihydronovobiocin are determined by measuring the comparative absorbence of the paper strip chromatogram under ultraviolet light using a suitable densitometer.

It has been observed that greater separation of descarbamyldihydronovobiocin and dihydronovobiocin is obtained if the paper chromatogram is carried out using paper impregnated with glycerol and allowing chloroform to flow down the sheet.

Any departure from the above description which conforms to the present invention is intended to be included within the scope of the claims.

What is claimed is:

1. A compound from the group consisting of descarbamylnovobiocin and descarbamyldihydronovobiocin, said compounds being in the form of solids having melting points in excess of about 130° C.

2. Descarbamylnovobiocin in the form of a solid having a melting point in excess of about 130° C.

3. Descarbamyldihydronovobiocin in the form of a solid having a melting point in excess of about 130° C.

References Cited in the file of this patent

Wagner et al.: Synthetic Organic Chemistry, 1953, publ. by John Wiley & Sons, Inc. (N.Y.), pp. 645 to 647.

Hoeksema et al.: J.A.C.S., vol. 78, May 5, 1956, pp. 2019 to 2020.

Kaczka et al.: J.A.C.S., vol. 78, No. 16, Aug. 20, 1956, pp. 4125 to 4127.

Kaczka et al.: J.A.C.S., vol. 77, pp. 6404 and 6405.

Smith et al.: Antibiotics and Chemotherapy, vol. 6, pp. 135 to 141.